US010072723B2

(12) United States Patent
Hart

(10) Patent No.: US 10,072,723 B2
(45) Date of Patent: Sep. 11, 2018

(54) CLOSING ASSEMBLY FOR A MAGNETO-RHEOLOGICAL DAMPER

(71) Applicant: BeijingWest Industries Co., Ltd., Beijing (CN)

(72) Inventor: John A. Hart, Liberty Township, OH (US)

(73) Assignee: BeijingWest Industries Co., Ltd., Beijing (CN)

( * ) Notice: Subject to any disclaimer, the term of this patent is extended or adjusted under 35 U.S.C. 154(b) by 25 days.

(21) Appl. No.: 15/051,729

(22) Filed: Feb. 24, 2016

(65) Prior Publication Data

US 2016/0312850 A1 Oct. 27, 2016

Related U.S. Application Data

(60) Provisional application No. 62/152,118, filed on Apr. 24, 2015.

(51) Int. Cl.
*F16F 9/36* (2006.01)
*F16F 9/53* (2006.01)

(52) U.S. Cl.
CPC ............. *F16F 9/363* (2013.01); *F16F 9/535* (2013.01); *F16F 2222/06* (2013.01); *F16F 2224/045* (2013.01)

(58) Field of Classification Search
CPC ........ F16F 9/362; F16F 9/535; F16F 2222/06; F16F 9/432; F16F 9/36; F16F 9/366
USPC ............................. 188/322.17; 92/165 R, 168
See application file for complete search history.

(56) References Cited

U.S. PATENT DOCUMENTS 3,549,154 A * 12/1970 Jones .................. F16J 15/3208
 15/220.4
3,771,629 A 11/1973 Fader et al.
4,166,523 A * 9/1979 Fujii ........................ F16F 9/18
 188/322.17

(Continued)

FOREIGN PATENT DOCUMENTS

EP 0016954 A1 10/1980
JP 2008215406 A 9/2008

(Continued)

OTHER PUBLICATIONS

Japanese Office Action; dated Dec. 20, 2016, Ten (10) Pages.

*Primary Examiner* — Bradley T King
*Assistant Examiner* — James K Hsiao
(74) *Attorney, Agent, or Firm* — William H. Honaker; Dickinson Wright PLLC

(57) ABSTRACT

A closing assembly for a magneto-rheological damper includes a housing defining a through bore with a first, second, third, fourth, fifth and sixth counter-bores having varied diameters. A wiper seal is disposed in the first counter-bore and an upper seal is disposed in the second counter-bore. A guide is disposed in the fourth counter-bore. The guide and the upper seal and the third counter-bore define a first chamber. A plate defining a passage is disposed axially below the guide in the fifth counter-bore with a flange extending into the sixth counter-bore. A lower seal is disposed in the passage. The guide and the plate and the fifth counter-bore define a second chamber. The first and second chambers separate and contain a lubricating oil adjacent to the upper seal and lower seal.

20 Claims, 8 Drawing Sheets

(56) References Cited

U.S. PATENT DOCUMENTS

| | | | | |
|---|---|---|---|---|
| 4,485,899 A * | 12/1984 | Grundei | ............... | F16F 9/062 188/277 |
| 4,987,826 A * | 1/1991 | Deppert | ............... | F16F 9/364 188/322.17 |
| 4,989,701 A * | 2/1991 | Yamaoka | ............... | F16F 9/364 188/315 |
| 4,995,623 A * | 2/1991 | Wada | ............... | F16F 9/364 188/322.17 |
| 5,224,573 A * | 7/1993 | Amemiya | ............... | F16F 9/364 188/315 |
| 5,441,132 A * | 8/1995 | Pradel | ............... | F16F 9/3242 188/276 |
| 5,531,299 A * | 7/1996 | Bataille | ............... | F16F 9/363 188/322.17 |
| 5,533,598 A * | 7/1996 | Adrian | ............... | F16F 9/363 188/322.17 |
| 6,253,661 B1 * | 7/2001 | Fenn | ............... | F16F 9/3242 92/165 R |
| 6,311,810 B1 * | 11/2001 | Hopkins | ............... | F16F 9/535 188/267.2 |
| 6,318,526 B1 * | 11/2001 | Kruckemeyer | ............... | F16F 9/362 188/322.17 |
| 6,390,258 B1 * | 5/2002 | Hofmann | ............... | B60G 13/008 188/322.16 |
| 6,510,930 B2 * | 1/2003 | Kime | ............... | B60G 13/008 188/322.17 |
| 6,547,046 B2 * | 4/2003 | Yamaguchi | ............... | F16F 9/363 188/322.17 |
| 6,640,943 B1 * | 11/2003 | Daws | ............... | F16F 9/3242 188/322.17 |
| 6,820,729 B2 * | 11/2004 | Verriet | ............... | F16F 9/36 188/322.17 |
| 6,840,358 B2 * | 1/2005 | Kos | ............... | F16F 9/362 188/321.11 |
| 6,883,649 B2 * | 4/2005 | Lun | ............... | F16F 9/3242 188/267 |
| 7,000,744 B2 * | 2/2006 | Harbu | ............... | F16F 9/3242 188/322.17 |
| 7,011,193 B2 | 3/2006 | Lemmens et al. | | |
| 7,172,200 B2 | 2/2007 | Watling et al. | | |
| 7,703,587 B2 * | 4/2010 | Strong | ............... | F16F 9/362 188/322.17 |
| 7,849,983 B2 * | 12/2010 | St. Clair | ............... | B60G 99/002 188/267.1 |
| 7,997,393 B2 * | 8/2011 | Hart | ............... | F16F 9/3285 188/267.2 |
| 8,215,463 B2 * | 7/2012 | Kondo | ............... | F16F 9/535 188/267.2 |
| 2001/0023638 A1 * | 9/2001 | Yamaguchi | ............... | F16F 9/363 92/165 R |
| 2002/0162714 A1 * | 11/2002 | Ma | ............... | B24B 21/004 188/267.2 |
| 2003/0070893 A1 * | 4/2003 | Adrian | ............... | F16F 9/363 188/322.16 |
| 2004/0182661 A1 * | 9/2004 | Lun | ............... | F16F 9/3242 188/267.2 |
| 2009/0107779 A1 * | 4/2009 | Azekatsu | ............... | F16F 9/535 188/267.2 |
| 2009/0205913 A1 * | 8/2009 | Hart | ............... | F16F 9/3285 188/267.2 |
| 2009/0294231 A1 * | 12/2009 | Carlson | ............... | F16F 9/537 188/267.2 |
| 2010/0096818 A1 * | 4/2010 | Marjoram | ............... | B60G 99/002 280/5.515 |
| 2010/0108150 A1 * | 5/2010 | Ford | ............... | F04B 47/02 137/14 |
| 2010/0109276 A1 * | 5/2010 | Marjoram | ............... | B60G 99/002 280/124.157 |
| 2010/0116607 A1 * | 5/2010 | Lun | ............... | F16F 9/362 188/267.2 |
| 2014/0202809 A1 * | 7/2014 | Ozaki | ............... | F16F 9/36 188/322.17 |

FOREIGN PATENT DOCUMENTS

| | | |
|---|---|---|
| JP | 2009127722 A | 6/2009 |
| JP | 2010031970 A | 2/2010 |
| JP | 2011214633 A | 10/2011 |
| JP | 2014119066 A | 6/2014 |
| WO | 2014109189 A | 7/2014 |

* cited by examiner

US 10,072,723 B2

CLOSING ASSEMBLY FOR A MAGNETO-RHEOLOGICAL DAMPER

CROSS REFERENCE TO RELATED APPLICATION

This application claims the benefit of U.S. Provisional Application No. 62/152,118 filed Apr. 24, 2015, which is incorporated herein by reference in its entirety.

BACKGROUND OF THE INVENTION

1. Field of the Invention

A closing assembly for a magneto-rheological damper.

2. Description of the Prior Art

Magneto-rheological (MR) dampers are increasingly used on vehicles to continuously control damping characteristics for proper ride and handling in all driving situations. Magneto-rheological fluid generally consists of a clear carrier or base fluid (e.g. polyalphaolefin) with suspended particles. When the particles are charged with a magnetic field, they line up and change the viscosity of the fluid, which in turn can be used to control damping forces.

The closing system or assembly of an MR damper generally incorporates a primary seal and bearing surface for the piston rod of the damper. Known closing assemblies use one primary seal and a dry anodized bearing surface and are therefore limited in the amount of side-load the damper can handle. Other known closing assemblies incorporate a wet bearing through the use of two seals and a porous stainless steel rod guide. The rod guide can filter out the particles from the MR fluid so that only the base clear fluid lubricates the bearing and primary seal. However, even closing assemblies which filter the MR particles are susceptible to increases in friction over time due to metallic particles contaminating the carrier fluid near the bearing and the seals. Additionally, the carrier fluid of the MR fluid may not possess the ideal lubricity for properly lubricating the seal and bearing. Therefore, there remains a need for improved MR damper closing assemblies which can better handle increased friction over long periods of damper use.

SUMMARY AND ADVANTAGES OF THE INVENTION

The invention provides for such a closing assembly for a damper including an annular housing extending along a central longitudinal axis from a top end to a bottom end and defining a through bore axially extending therethrough having an inner surface. A guide defines a central opening axially extending therethrough and has a top and a bottom and is disposed in the through bore for guiding a piston rod of the damper. An upper seal is disposed in the through bore in a spaced relationship with the top of said guide for contacting and sealing against the piston rod. A lower seal is disposed in the through bore in a spaced relationship with the bottom of the guide for contacting and sealing against the piston rod. The guide has an exterior defining a plurality of longitudinally extending channels disposed in a spaced relationship circumferentially about the guide. The top of the guide and the upper seal and the inner surface of the through bore define a first chamber. The bottom of the guide and the lower seal and the inner surface of the through bore define a second chamber in fluid communication with the first chamber through the channels for separating and maintaining a volume of isolated oil to lubricate the guide and the upper seal and the lower seal.

The invention also provides for a closing assembly for a damper including an annular housing extending from a top end to a bottom end along a central longitudinal axis and defining a through bore axially extending therethrough having an inner surface. A guide defines a central opening and has a top and a bottom and is disposed in the through bore for guiding a piston rod of the damper. An upper seal is disposed in the through bore in a spaced relationship with the top of the guide for contacting and sealing against the piston rod. A plate defines a passage extending axially therethrough and is disposed in the through bore in a spaced relationship with the bottom of the guide. A lower seal is disposed in the passage of the plate for contacting and sealing against the piston rod. The guide has an exterior defining a plurality of longitudinally extending channels disposed in a spaced relationship circumferentially about the guide. The top of the guide and the upper seal and the inner surface of the through bore define a first chamber. The bottom of the guide and the plate and the inner surface of the through bore define a second chamber in fluid communication with the first chamber through the channels for separating and maintaining a volume of isolated oil to lubricate the guide and the upper seal and the lower seal.

Thus, several advantages of one or more aspects of the closing assembly are that it seals the top of the damper to prevent leakage of the damper fluid (e.g., magneto-rheological fluid) and to prevent contamination of the damper fluid by outside contaminants while providing reduced friction with the piston rod. The closing assembly separates the magneto-rheological (MR) fluid from lubricating oil contained within the closing assembly to provide optimal lubrication of the seals and guide of the closing assembly, leading to a reduction in friction.

BRIEF DESCRIPTION OF THE DRAWINGS

These and other aspects, features, and advantages of the present invention will be readily appreciated, as the same becomes better understood by reference to the following detailed description when considered in connection with the accompanying drawings wherein.

DESCRIPTION OF THE ENABLING EMBODIMENT

Referring to the Figures, wherein like numerals indicate corresponding parts throughout the several views, a closing assembly 20 for a magneto-rheological (MR) damper constructed in accordance with the subject invention is disclosed. Dampers of the type of which the present invention pertains are generally filled with MR fluid, which includes a carrier fluid as well as suspended micro-particles which can cause an increase in apparent viscosity of the MR fluid when exposed to a magnetic field. The closing assembly 20 is intended to be used at the top of an MR damper to provide lubrication for a piston rod (not shown) extending therethrough while sealing the top of the MR damper to prevent leakage of the MR fluid and prevent contamination of the MR fluid by outside contaminants, such as dust, dirt, or other fluids.

Figure 1:
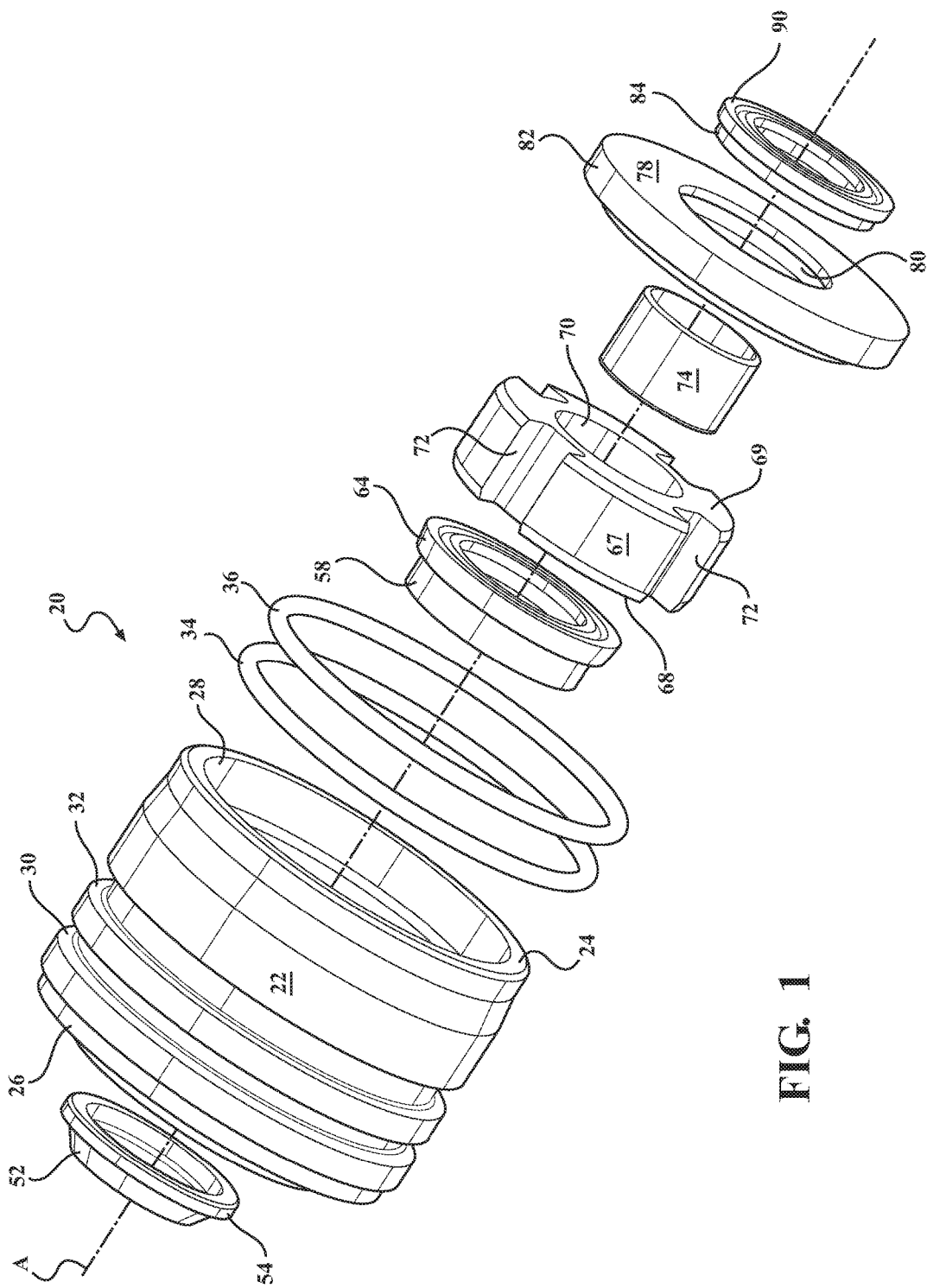
FIG. 1 is an exploded view of a closing assembly constructed in accordance with a first enabling embodiment of the present invention.
Figure 2:
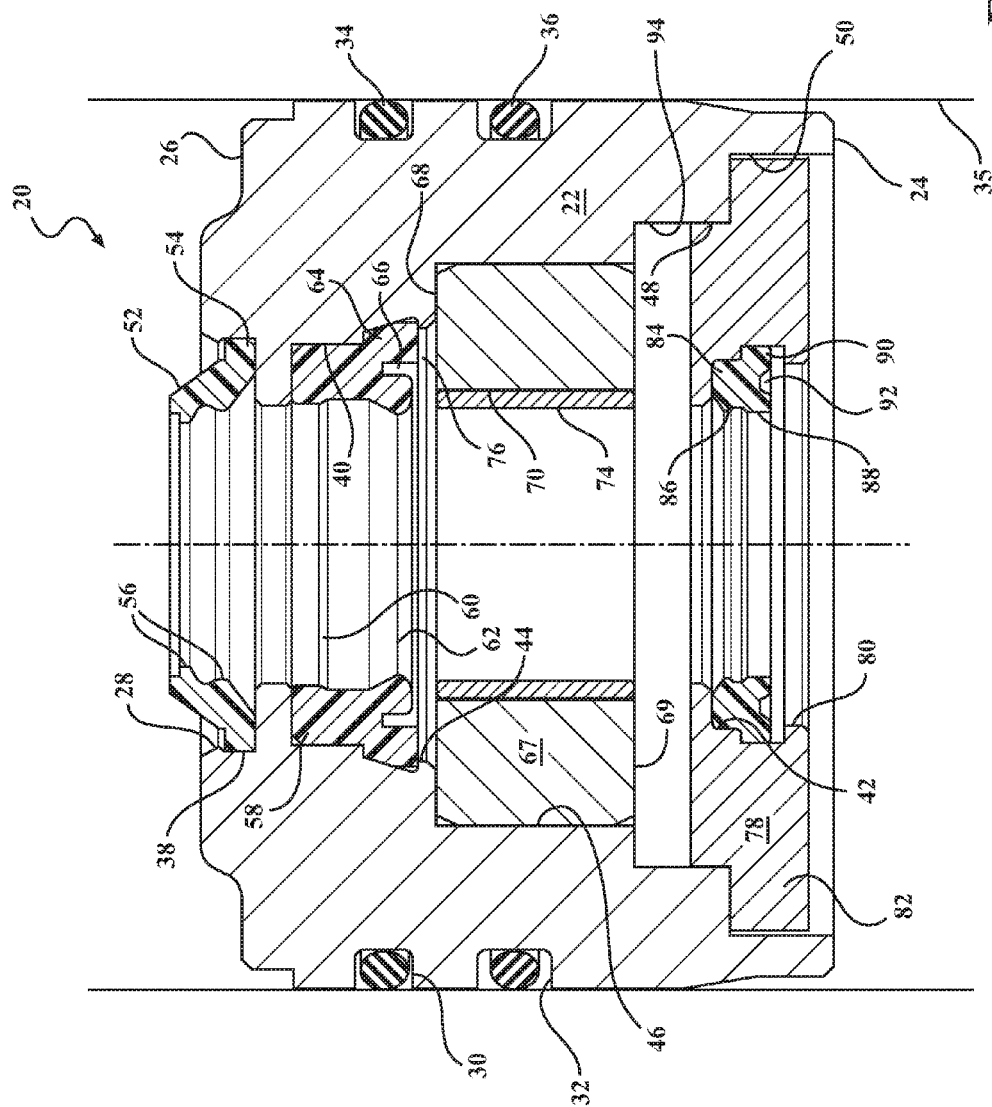
FIG. 2 is a cross-sectional view of the closing assembly of FIG. 1.

As illustrated in FIGS. 1 and 2, a first enabling embodiment of the closing assembly 20 includes an annular housing 22 extending along a central longitudinal axis A from a bottom end 24 to a top end 26. The housing 22 has an outer surface and defines a through bore 28 axially extending therethrough having an inner surface and being coaxially aligned with the longitudinal axis A. The through bore 28 is configured to accept the piston rod of the damper. The outer surface of the housing 22 defines a first annular groove 30 (i.e., a secondary retaining groove) and a second annular groove 32 disposed axially below and in a spaced relationship with the first annular groove 30. A first O-ring 34 is disposed in the first annular groove 30 and serves dual purposes, one provide volume fill to reduce MR fluid residue from an automatic fill process for the secondary retaining groove or first annular groove 30 and two—for sealing and engaging a cylindrical tube 35 of the damper. A second O-ring 36 is disposed in the second O-ring specific annular groove or the second annular groove 32 for sealing and engaging the cylindrical tube 35 of the damper.

The inner surface of the through bore 28 defines a plurality of increasing diameter counter-bores 38, 40, 44, 46, 48, 50 as described below. A first counter-bore 38 extends radially outwardly and has a first diameter and is disposed adjacent the top end 26. A second counter-bore 40 has a second diameter and a third counter-bore 44 having a third diameter both extend radially outwardly and are located below a rod exit hole adjacent the top end 26 (i.e., longitudinally below the first counter-bore 38) to form an assembly error proof stepped gland for housing the primary seal 64, discussed in more detail below. A fourth counter bore 46 extends radially outwardly and has a fourth diameter that is a significantly larger than the second diameter of the second counter-bore 40 and the third diameter of the third counter-bore 44. The fourth counter-bore 46 is disposed longitudinally below and proximate the third counter-bore 44. A fifth counter-bore 48 extends radially outwardly and has a fifth diameter larger than the fourth diameter of the fourth counter-bore 46 and longitudinally abuts the fourth counter-bore 46. A sixth and final counter-bore 50 extends radially outwardly and has a sixth diameter larger than the fifth diameter of the fifth counter-bore 48 and is disposed adjacent the bottom end 24 and longitudinally abuts the fifth counter-bore 48.

An annular wiper seal 52 is coaxially aligned with the longitudinal axis A and is disposed in the first counter-bore 38 of the through bore 28 for externally sealing the housing 22 and internally sealing through contact with the piston rod of the damper. The wiper seal 52 has a generally frustoconical shape with a tapered outer wall extending axially and radially to a circumferential edge 54 that engages the first counter-bore 38. The wiper seal 52 additionally includes a pair of inwardly extending lips 56 that are adapted to capture lubricant and make sealing contact with the piston rod.

The closing assembly 20 also includes an annular stepped upper seal 58 coaxially aligned with the longitudinal axis A and disposed in counter-bores 40, 44 of the through bore 28 for sealing contacting the piston rod. In the first enabling embodiment of the present invention, the upper seal 58 is a primary seal and includes a first upper section having a guide or first sealing lip 60 extending radially inwardly and the upper seal 58 engages the second counter-bore 40 of the housing 22. The primary or upper seal 58 additionally includes a second lower section that depends downwardly and axially a first length from the first section and includes a second sealing lip 62 extending radially inwardly and an annular sealing lip 64 extending radially outwardly from the second section and engaging the third counter-bore 44. The upper seal 58 further defines a U-shaped furrow 66 extending axially into the upper seal 58 and disposed between the second sealing lip 62 and the annular sealing lip 64 allowing for both second sealing lip 62 and the annular sealing lip 64 to flex radially inwardly and outwardly respectively when affected by pressure.

A guide 67 is symmetric with an annular shape that has an exterior and a top 68 and a bottom 69 and defines a central opening 70 axially extending therethrough. The guide 67 is disposed in the fourth counter-bore 46 of the through bore 28. The guide 67 of the enabling embodiments of the present invention are made of aluminum (e.g. sintered or machined 6061-T6 aluminum), however, it should be understood that the guide 67 may be formed of other materials such as, but not limited to other metals, or even organic polymeric materials. The exterior of the guide 67 defines a plurality of longitudinally extending channels 72 disposed in a spaced relationship circumferentially about the guide 67. Although the enabling embodiments disclosed herein include four channels 72, it should be appreciated that a greater or fewer number of channels 72 could be employed instead. A bearing 74 is disposed within the opening 70 of the guide 67 and is adapted to contact (e.g., slide) and receive the piston rod. The guide 67 and the upper seal 58 are in a spaced relationship with one another. Consequently, the top 68 of the guide 67 and the upper seal 58 and the third counter-bore 44 of the through bore 28 define a first chamber 76 for containing a lubricating oil adjacent to the upper seal 58. The top 68 of the guide 67 may also be angled to direct lubricant toward the upper seal 58 and toward the piston rod.

A plate 78 defining a passage 80 having an interior that extends axially therethrough is disposed axially below and in a spaced relationship with the bottom 69 of the guide 67. The plate 78 includes a radially extending flange 82 and is coaxially aligned with the longitudinal axis A. The plate 78 is disposed in the fifth counter-bore 48 and the flange 82 extends radially outwardly into the sixth counter-bore 50. As a result, the flange 82 provides error proofing during manufacturing. Because the flange 82 will not fit in the fifth counter-bore 48, the plate 78 cannot be installed upside down. The interior of the passage 80 of the plate 78 defines stepped recess 42, which along with passage 80 form an assembly error proof seal gland. The plate 78 enables the guide 67 to be easily manufactured since no seal glands need to be formed in the guide 67. In other words, if the plate 78 did not include a plate recess 42, the guide 67 may need to include a seal gland to take the place of the plate recess 42.

An annular lower seal 84 is coaxially aligned with the longitudinal axis A and is disposed in the plate recess 42 and extends into the passage 80 for contacting and sealing against the piston rod. In the first enabling embodiment of the present invention, the lower seal 84 is a buffer seal that includes a first section having a first rim 86 extending radially inwardly. The buffer or lower seal 84 is disposed in and engages the plate recess 42 of the plate 78. The lower seal 84 additionally includes a second section depending downwardly and axially a second length from the first section and including a second rim 88 extending radially inwardly and an annular sealing rim 90 extending radially outwardly for engaging the passage 80. While the second length is less than the first length in the first enabling embodiment, it should be appreciated that other configurations of upper seals 58 and lower seals 84 may be used. The lower seal 84 further defines a U-shaped trough 92 extending axially into the lower seal 84 and disposed between the second rim 88 and the annular sealing rim 90 for allowing the rim 88 and annular sealing rim 90 to flex radially inwardly and outwardly respectively under pressure. Because the annular sealing rim 90 of the buffer or lower seal 84 snaps into the passage 80, there is no need for a separate retainer. The cross-section of the buffer or lower seal 84 also increases pressure activation. Additionally, the lower seal 84 as disclosed provides an increase in durability and limits movement during equalized pressure events. The lower seal 84 is resistant to "lip flipping" which is known to happen with existing buffer seals. Although the lower seal 84 of the first enabling embodiment is inserted in the formed gland of plate recess 42 and passage 80 of the plate 78, an assembly of the lower seal 84 could, for example, directly engage a recess in the through bore 28, if no plate 78 is utilized. The lower seal 84 could alternatively be molded to the plate 78 to improve unwanted leakage caused by cold temperatures.

The bottom 69 of the guide 67 and the plate 78 and the fifth counter-bore 48 of the through bore 28 define a second chamber 94. It should be appreciated that if no plate is utilized, the bottom 69 of the guide 67 and the lower seal 84 itself would define the second chamber 94. The second chamber 94 is in fluid communication with the first chamber 76 through the channels 72 of the guide 67 for containing the lubricant or lubricating oil adjacent to the lower seal 84. Given the lack of lubricity of the carrier fluid used in the MR fluid, it is preferable to use a lubricant in the closing assembly 20 (i.e., within the first chamber 76, channels 72, and second chamber 94) that is different than the carrier fluid to extend the life of MR dampers. The present invention separates the working magneto-rheological (MR) fluid of the damper from the lubricating oil contained within the closing assembly 20. More specifically, the lubricating oil of the enabling embodiments disclosed herein is shock oil, however, it should be appreciated that the lubricating oil may be some other type of lubricant.

The plate 78 is adapted to limit particle build-up from the MR fluid and keeps the MR fluid of the damper separate from lubricant in the closing assembly 20 and allows the buffer seal or lower seal 84 to be located closer to the MR fluid of the damper, which provides additional volume of lubricating oil above the buffer seal. The plate 78 and lower seal 84 act as a first line of defense to keep the MR fluid and particles in the damper and out of the closing assembly 20. The first and second chambers 76, 94 combined with the channels 72 of the guide 67 provide a large volume of lubricating or shock oil to fill the closing assembly 20 consequently preventing the MR fluid from entering the closing assembly 20. Any particles suspended in the MR fluid (e.g. located in cylindrical tube 35 of the damper below the closing assembly 20) that do get by the buffer or lower seal 84 simply fall into the shock oil in the chambers 76, 94 instead of building up at the seals 58, 84, and bearing 74.

Figure 3:
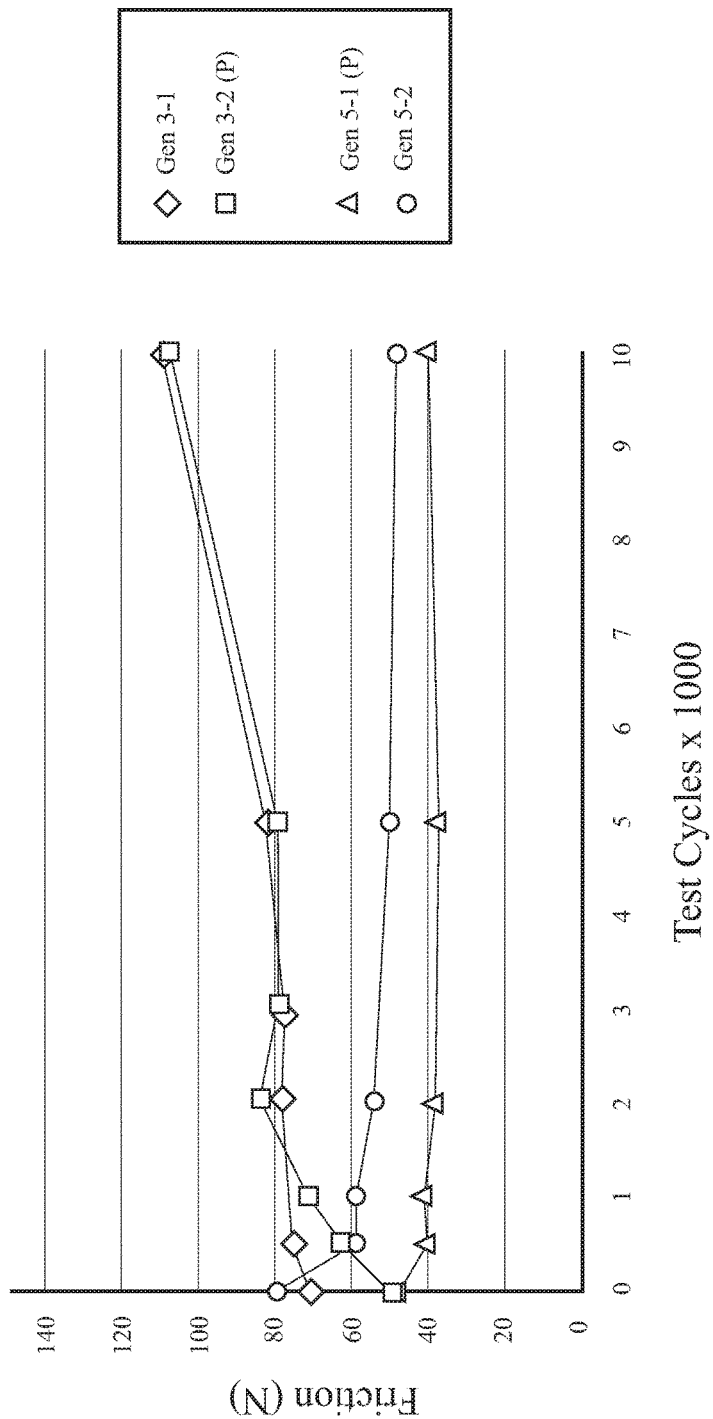
FIG. 3 is a graph illustrating an improvement in friction as a function of test cycles for the first enabling embodiment of the present invention (at test speed that limits damping effect)
Figure 4:
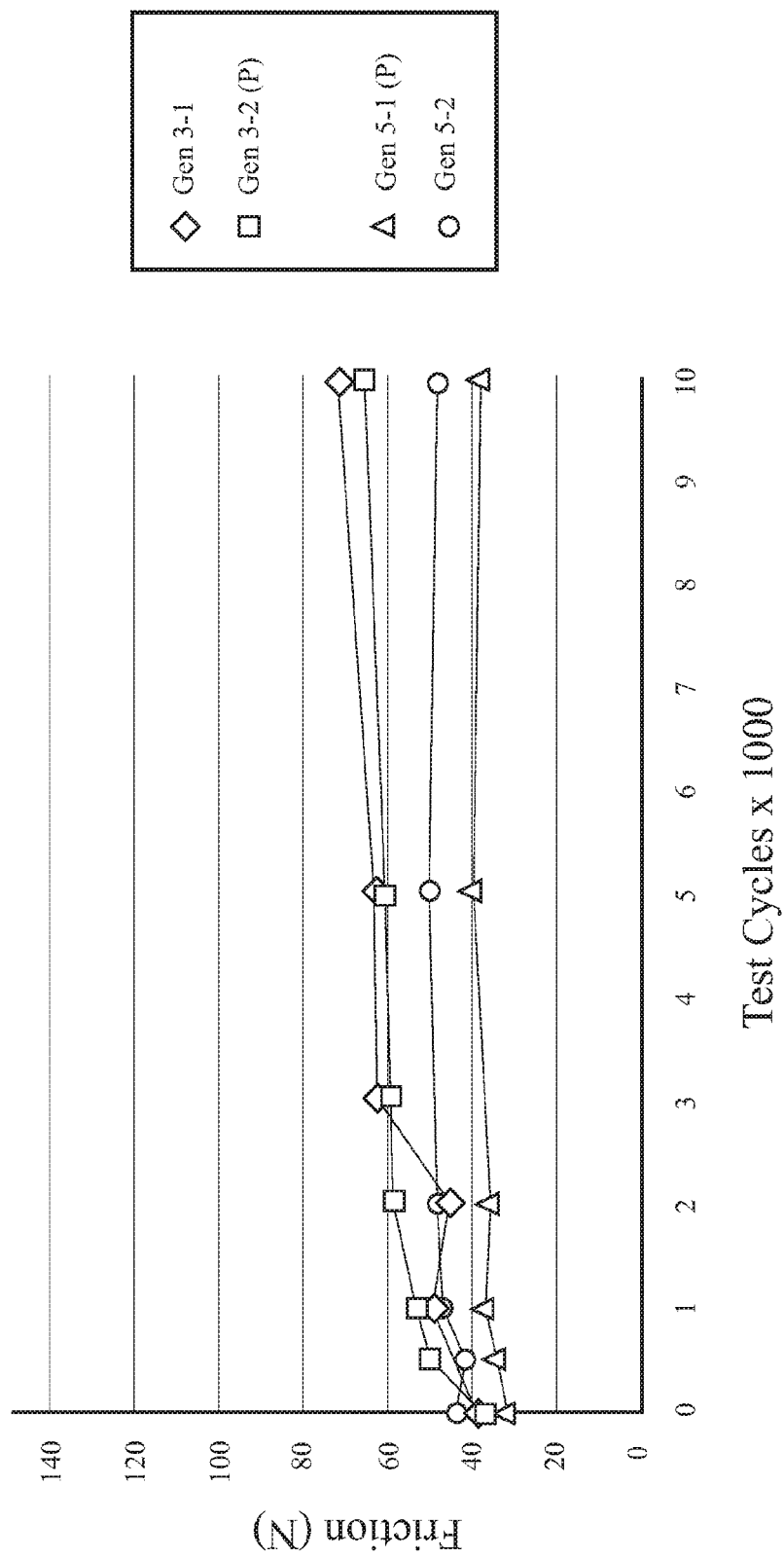
FIG. 4 is a graph illustrating an improvement in friction as a function of test cycles for the first enabling embodiment of the present invention (at original equipment manufacturer's requested test speed)

Accordingly, the first enabling embodiment exhibits a reduction in friction as a function of test cycles as illustrated by FIGS. 3 and 4. Specifically, data points indicated as being for "Gen 3" are for dampers which utilize a porous guide that filters base fluid from the MR fluid of the damper. Data points indicated as being for "Gen 5" are for dampers incorporating features disclosed herein for the first embodiment of the invention. As shown in the graphs of FIGS. 3 and 4, the "Gen 3" dampers are susceptible to increases in friction over time due to metallic particle invasion from the MR fluid and lack of lubricity of the base fluid which is filtered through the guide. The "Gen 5" dampers, in comparison, exhibit a significant reduction in friction over user cycles.

Figure 5:
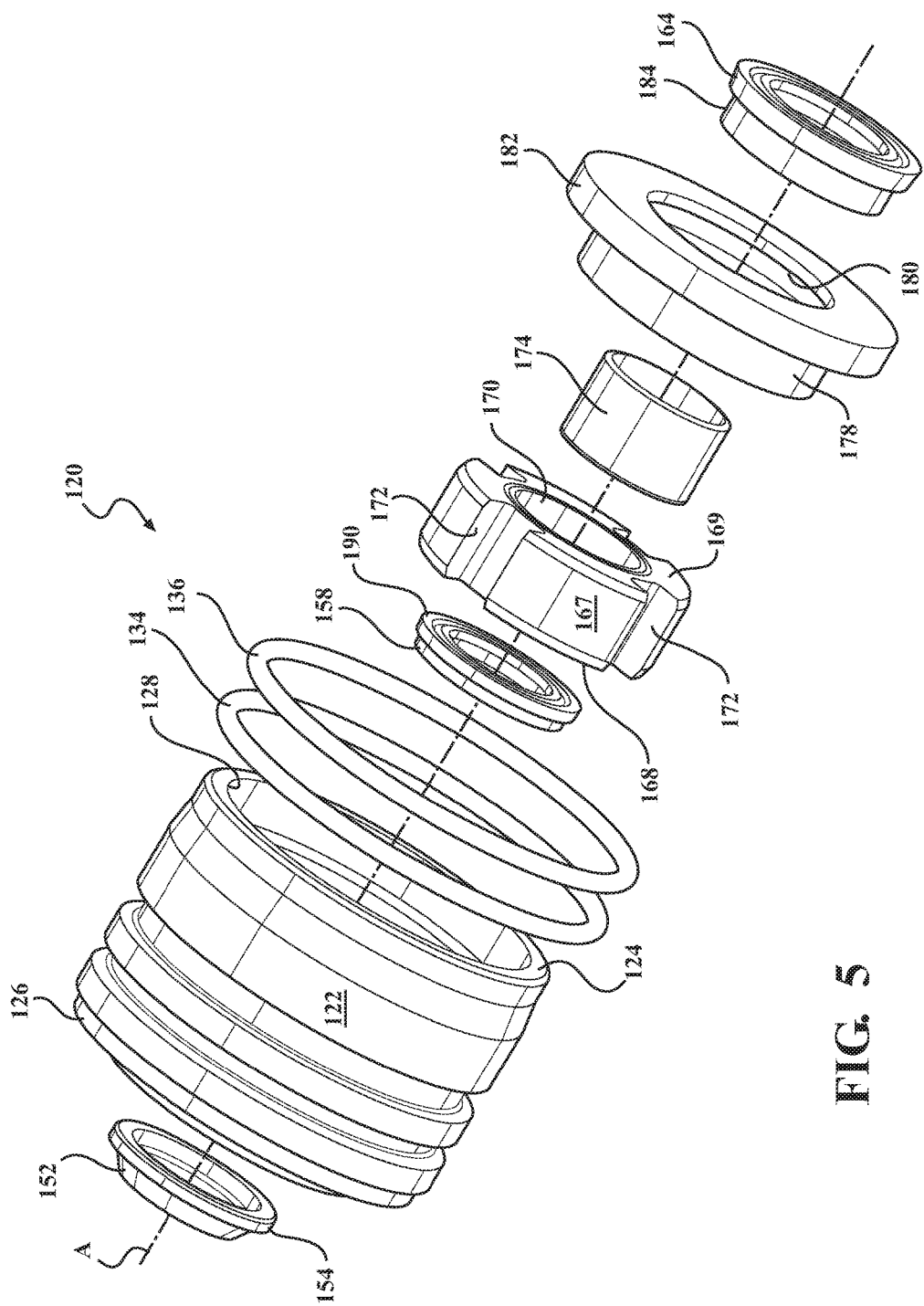
FIG. 5 is an exploded view of a closing assembly constructed in accordance with a second enabling embodiment of the present invention.
Figure 6:
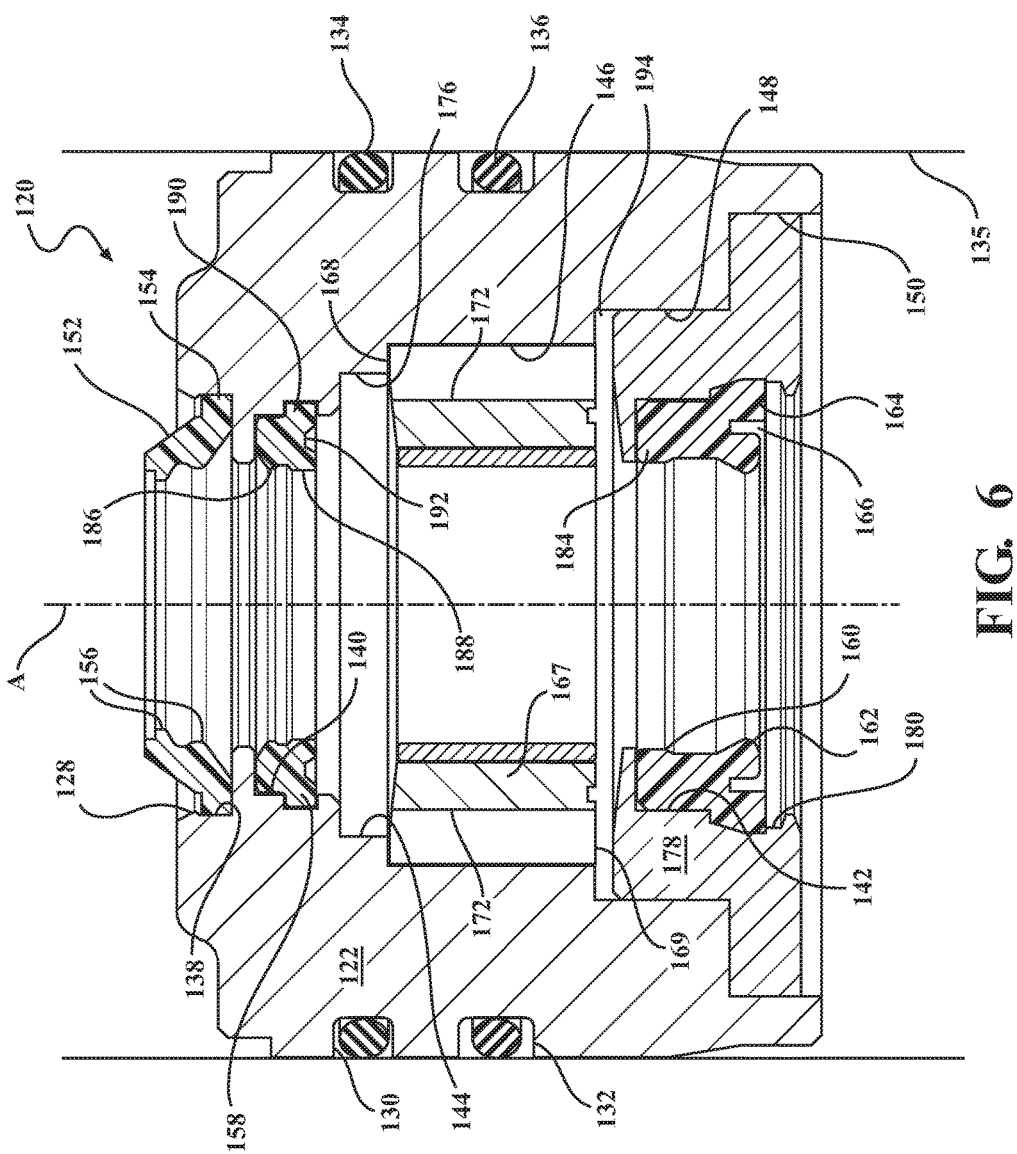
FIG. 6 is a cross-sectional view of the closing assembly of FIG. 5.

FIGS. 5 and 6 illustrate a second enabling embodiment of the present invention, wherein the same reference numerals used above, offset by a factor of 100, are used to identify like features. The closing assembly 120 of the second enabling embodiment also separates the MR fluid of the damper from the lubricating fluid (e.g. shock oil) needed by the closing assembly 120 components to function properly. In the second enabling embodiment, the upper seal 158 is a buffer seal that includes a first section having a first guide rim 186 extending radially inwardly. The buffer or upper seal 158 (same seal design as lower seal 84 in first embodiment) of the second enabling embodiment is disposed in the stepped seal gland formed by the second and third counter-bores 140, 144 of the housing 122. The upper seal 158, as in the lower seal 84 described above, has a lower section that consists of the inner and outer sealing lips (i.e., second rim 188 and annular sealing rim 190) respectively extending radially inwardly and outwardly. The sealing rim 188 and annular sealing rim 190, engage the piston rod on the inner diameter of the upper seal 158 and the gland wall or third counter-bore 144 on the outer diameter of the upper seal 158. The upper seal 158 further defines a U-shaped trough 192 extending axially into the upper seal 158 and disposed between the second rim 188 and the annular sealing rim 190 for allowing the associated ends of the upper seal 158 to flex radially inward and outwardly if under pressure.

The second enabling embodiment of the present invention also includes a primary seal as the lower seal 184 (same as upper seal 58 in first embodiment). The primary or lower seal 184 includes a first section having a guide or first sealing lip 160 extending radially inwardly. The lower seal 184 is disposed in the stepped seal gland formed by plate recess 142, and the passage 180 of the plate 178. The primary or lower seal 184 additionally includes a lower section that depends downwardly and axially a first length from the first section and includes a second sealing lip 162 extending radially inwardly and an annular sealing lip 164 extending radially outwardly from the second section and engaging the passage 180. The lower seal 184 further defines a U-shaped furrow 166 extending axially into the lower seal 184 and disposed between the second sealing lip 162 and the annular sealing lip 164 allowing for both the primary sealing lip 162 and annular sealing lip 164 to flex radially inward and outwardly respectively when affected by pressure. While the heights of the seals 158, 184 are different in the second enabling embodiment, it should be appreciated that other configurations of upper seals 158 and lower seals 184 may be used (i.e. two shorter primary seals similar to 184 with a shorter first section). This would allow for even larger lubricant volumes.

Figure 7:
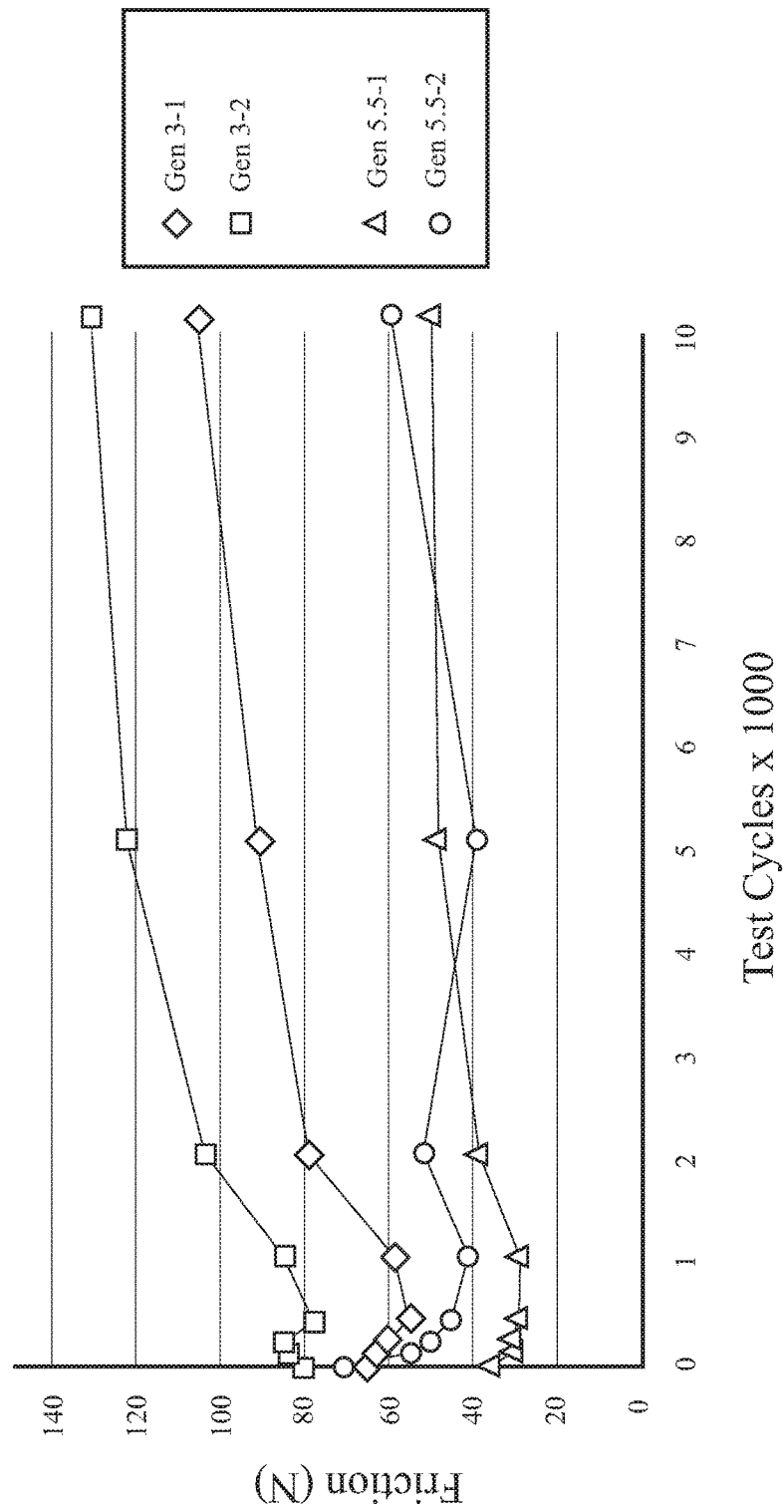
FIG. 7 is a graph illustrating an improvement in friction as a function of test cycles for the second enabling embodiment of the present invention (at test speed that limits damping effect)
Figure 8:
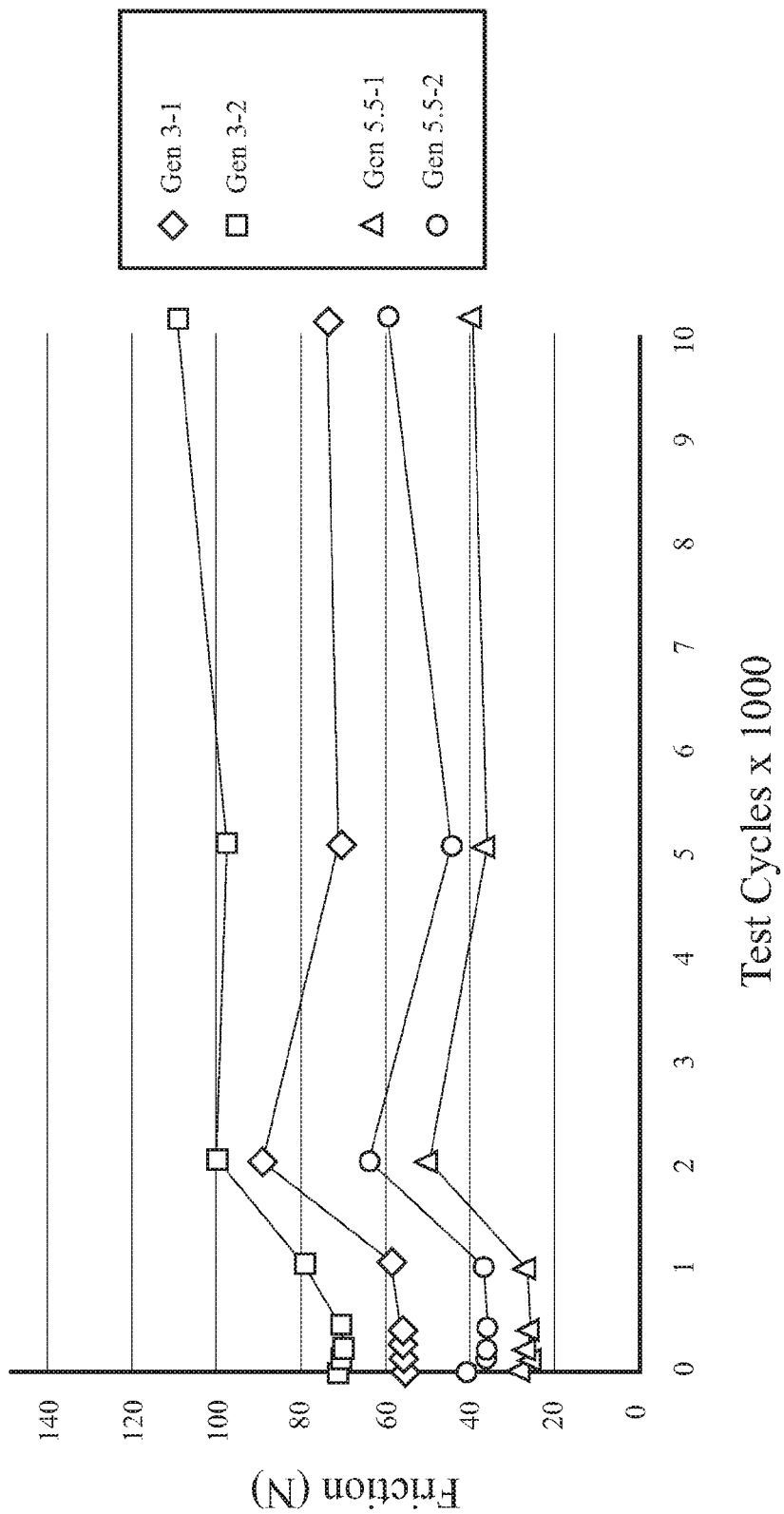
FIG. 8 is a graph illustrating an improvement in friction as a function of test cycles for the second enabling embodiment of the present invention (at original equipment manufacturer's requested test speed).

Similar to the first enabling embodiment, the guide 167 has an exterior and a top 168 and a bottom 169 and defines a central opening 170. The guide 167 is disposed in the second counter-bore 146 below the upper seal gland of the through bore 128. The guide 167 and the upper seal 158 are in a spaced relationship with one another as are the plate 178 and the guide 167. So, the top 168 of the guide 167 and the bottom of the buffer or upper seal 158 and the inner surface of the through bore 128 created by counter-bore 144 define a first chamber 176. Which is in fluid communication with a second chamber 194 defined by the bottom 169 of the guide 167 and the top of plate 178 and the inner surface of the through bore 128 created by counter-bore 148. This is for separating and maintaining a volume of isolated oil to lubricate the guide 167 and the second seal 158 and the primary seal 184. The lower seal 184 is always supplied with lubricant and does not rely on the piston rod to transfer lubricant. The wiper seal 152 of the second enabling embodiment is adapted to operate at a lower pressure to seal the lubricant in the closing assembly 120 from the environment. The cross-section and function of the wiper seal 152 is identical to the wiper seal 52 in the first enabling embodiment. The plate 178 allows the lower seal 184 to be located closer to the MR fluid of the damper (e.g. located in cylindrical tube 135 of the damper below the closing assembly 20), and provides an additional volume of lubricating oil above the lower seal 184. The plate 178 and lower seal 184 act as a primary line of defense to keep the MR fluid and particles in the damper and out of the closing assembly 120. The first and second chambers 176, 194 combined with the channels 172 of the guide 167 provide a large volume of lubricating or shock oil to fill the closing assembly 120 consequently preventing the MR fluid from entering the closing assembly 120. Any particles suspended in the MR fluid that do get by the primary or lower seal 184 simply fall into the shock oil in the chambers 176, 194 instead of building up at the seals 158, 184 and bearing 174. Consequently, the second enabling embodiment exhibits a reduction in friction as a function of test cycles as illustrated by FIGS. 7 and 8. Specifically, data points indicated as being for "Gen 3" are for dampers which utilize a porous guide that filters base fluid from the MR fluid of the damper. Data points indicated as being for "Gen 5.5" are for dampers incorporating features disclosed herein for the second embodiment of the invention, and exhibit significantly reduced friction compared to the "Gen 3" dampers.

To be noted, the first enabling embodiment Gen 5 design (shown in FIGS. 1 and 2) has a seal configuration with the buffer seal (i.e., lower seal 84) at the MR fluid. That configuration allows eventual pressure build up between the two seals (i.e., between the upper seal 58 and the lower seal 84), thus energizing the primary or upper seal 58. The second enabling embodiment Gen 5.5 (shown in FIGS. 5 and 6) places the primary seal (i.e., lower seal 184) at the MR fluid and limits any pressure build up between seals (i.e., between the upper seal 158 and the lower seal 184). The upper seal 158 then need only keep the oil volume in the chambers 176, 194.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A closing assembly for a damper comprising:
   an annular housing extending along a central longitudinal axis from a top end to a bottom end and defining a through bore axially extending therethrough having an inner surface,
   a guide defining a central opening axially extending therethrough and having a top and a bottom and being disposed in said through bore for guiding a piston rod of the damper,
   an upper seal disposed in said through bore in a spaced relationship with said top of said guide for contacting and sealing against the piston rod,
   a lower seal disposed in said through bore in a spaced relationship with said bottom of said guide for contacting and sealing against the piston rod,
   said guide being symmetric with an annular shape and having an exterior defining a plurality of longitudinally extending channels running through said guide from said top to said bottom and disposed in a spaced relationship circumferentially about said guide, and
   said top of said guide and said upper seal and said inner surface of said through bore defining a first chamber and said bottom of said guide and said lower seal and said inner surface of said through bore defining a second chamber in fluid communication with said first chamber through said channels for separating and maintaining a volume of isolated oil to lubricate said guide and said upper seal and said lower seal.

2. A closing assembly as set forth in claim 1, wherein said inner surface of said through bore defines a first counter-bore disposed adjacent said top end and said closing assembly further includes an annular wiper seal disposed in said first counter-bore for contacting and sealing against the piston rod of the damper and wherein said wiper seal has a generally frustoconical shape with a tapered outer wall extending axially to a circumferential edge engaging said first counter-bore and a pair of inwardly extending lips adapted to contact and seal against the piston rod.

3. A closing assembly as set forth in claim 2, wherein said inner surface of said through bore defines a second counter-bore disposed axially below and in a spaced relationship with said first counter-bore and a third counter-bore having a third diameter is disposed axially below and proximate said second counter-bore and a fourth counter-bore having a fourth diameter larger than said third diameter is disposed axially below and proximate said third counter-bore and a fifth counter-bore having a fifth diameter larger than said fourth diameter abuts said fourth counter-bore and wherein said upper seal is disposed in said second counter-bore and said guide is disposed in said fourth counter-bore and said lower seal is disposed in said fifth counter-bore.

4. A closing assembly as set forth in claim 1, wherein said housing has an outer surface defining a first annular groove and a second annular groove axially spaced from said first annular groove and said closing assembly further includes a first O-ring disposed in said first annular groove and a second O-ring disposed in said second annular groove for engaging and sealing a cylindrical tube of the damper.

5. A closing assembly as set forth in claim 1, further including a bearing disposed within said opening of said guide and adapted to contact and receive the piston rod.

6. A closing assembly as set forth in claim 1, wherein said plurality of channels of said guide include four channels.

7. A closing assembly for a damper comprising:
an annular housing extending along a central longitudinal axis from a top end to a bottom end and defining a through bore axially extending therethrough having an inner surface,
a guide defining a central opening and having a top and a bottom and being disposed in said through bore for guiding a piston rod of the damper,
an upper seal disposed in said through bore in a spaced relationship with said top of said guide for contacting and sealing against the piston rod,
a plate defining a passage extending axially therethrough and disposed in said through bore in a spaced relationship with said bottom of said guide,
a lower seal disposed in said passage of said plate for contacting and sealing against the piston rod,
said guide being symmetric with an annular shape and having an exterior defining a plurality of longitudinally extending channels running through said guide from said top to said bottom and disposed in a spaced relationship circumferentially about said guide, and
said top of said guide and said upper seal and said inner surface of said through bore defining a first chamber and said bottom of said guide and said plate and said inner surface of said through bore defining a second chamber in fluid communication with said first chamber through said channels for separating and maintaining a volume of isolated oil to lubricate said guide and said upper seal and said lower seal.

8. A closing assembly as set forth in claim 7, wherein said inner surface of said through bore defines a first counter-bore disposed adjacent said top end and said closing assembly further includes an annular wiper seal disposed in said first counter-bore for contacting and sealing against the piston rod of the damper and wherein said wiper seal has a generally frustoconical shape with a tapered outer wall extending axially to a circumferential edge engaging said first counter-bore and a pair of inwardly extending lips adapted to contact and seal against the piston rod.

9. A closing assembly as set forth in claim 8, wherein said inner surface of said through bore defines a second counter-bore disposed axially below and in a spaced relationship with said first counter-bore and a third counter-bore having a third diameter is disposed axially below and proximate said second counter-bore and a fourth counter-bore having a fourth diameter larger than said third diameter is disposed axially below and proximate said third counter-bore and a fifth counter-bore having a fifth diameter larger than said fourth diameter abuts said fourth counter-bore and a sixth counter-bore having a sixth diameter larger than said fifth diameter is disposed adjacent said bottom end and abuts said fifth counter-bore and wherein said upper seal is disposed in said second counter-bore and said guide is disposed in said fourth counter-bore.

10. A closing assembly as set forth in claim 9, wherein said plate is disposed in said fifth counter-bore and includes a radially extending flange extending radially outwardly into said sixth counter-bore and wherein said passage of said plate defines a plate recess and said lower seal is disposed in said plate recess.

11. A closing assembly as set forth in claim 10, wherein said lower seal includes a first section having a first sealing lip extending radially inwardly and a second section depending downwardly and axially a first length from said first section and including a second sealing lip extending radially inwardly.

12. A closing assembly as set forth in claim 11, wherein said lower seal includes an annular sealing lip extending radially outwardly from said second section and engaging said passage and said lower seal includes a furrow extending axially into said lower seal and disposed between said second sealing lip and said annular sealing lip for allowing said second sealing lip to flex radially outwardly.

13. A closing assembly as set forth in claim 10, wherein said lower seal includes a first section having a first rim extending radially inwardly and a second section depending downwardly and axially a second length from said first section and including a second rim extending radially inwardly.

14. A closing assembly as set forth in claim 13, wherein said lower seal includes an annular sealing rim extending radially outwardly from said second section and engaging said passage and said lower seal includes a trough extending axially into said lower seal and disposed between said second rim and said annular sealing rim for allowing said second rim to flex radially outwardly.

15. A closing assembly as set forth in claim 10, wherein said upper seal includes a first section having a first sealing lip extending radially inwardly and a second section depending downwardly and axially a first length from said first section and including a second sealing lip extending radially inwardly.

16. A closing assembly as set forth in claim 15, wherein said upper seal includes an annular sealing lip extending radially outwardly from said second section and engaging said third counter-bore and said upper seal includes a furrow extending axially into said upper seal and disposed between said second sealing lip and said annular sealing lip for allowing said second sealing lip to flex radially outwardly.

17. A closing assembly as set forth in claim 10, and wherein said upper seal includes a first section having a first rim extending radially inwardly and a second section depending downwardly and axially a second length from said first section and including a second rim extending radially inwardly.

18. A closing assembly as set forth in claim 17, wherein said upper seal includes an annular sealing rim extending radially outwardly from said second section and engaging said third counter-bore and said upper seal includes a trough extending axially into said upper seal and disposed between said second rim and said annular sealing rim for allowing said second rim to flex radially outwardly.

19. A closing assembly as set forth in claim 7, wherein said housing has an outer surface defining a first annular groove and a second annular groove axially spaced from said first annular groove and said closing assembly further includes a first O-ring disposed in said first annular groove and a second O-ring disposed in said second annular groove for engaging and sealing a cylindrical tube of the damper.

20. A closing assembly as set forth in claim 7, further including a bearing disposed within said opening of said guide and adapted to contact and receive the piston rod.

* * * * *